United States Patent
Namjoshi et al.

(10) Patent No.: US 9,723,074 B2
(45) Date of Patent: Aug. 1, 2017

(54) METHOD AND APPARATUS FOR IN THE MIDDLE PRIMARY BACKUP REPLICATION

(75) Inventors: Kedar Namjoshi, Basking Ridge, NJ (US); Pramod Koppol, Manalapan, NJ (US); Athanasios Stathopoulos, Jersey City, NJ (US); Gordon T. Wilfong, Bedminster, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 632 days.

(21) Appl. No.: 13/296,464

(22) Filed: Nov. 15, 2011

(65) Prior Publication Data
US 2013/0124479 A1  May 16, 2013

(51) Int. Cl.
G06F 7/00 (2006.01)
G06F 17/00 (2006.01)
H04L 29/08 (2006.01)
G06F 11/20 (2006.01)

(52) U.S. Cl.
CPC ...... *H04L 67/1095* (2013.01); *G06F 11/2038* (2013.01); *G06F 11/2097* (2013.01); *G06F 11/2048* (2013.01)

(58) Field of Classification Search
CPC .... G06F 7/00; G06F 11/2038; G06F 11/2097; G06F 11/2048; G06F 11/16; G06F 11/2028; H04L 67/1095
See application file for complete search history.

(56) References Cited

U.S. PATENT DOCUMENTS

| | | | |
|---|---|---|---|
| 5,303,302 A * | 4/1994 | Burrows | 713/161 |
| 5,369,757 A * | 11/1994 | Spiro et al. | 714/19 |
| 6,421,741 B1 | 7/2002 | Minyard | |
| 7,158,985 B1 * | 1/2007 | Liskov | |
| 2006/0010227 A1 | 1/2006 | Atluri | |
| 2009/0113109 A1 | 4/2009 | Nelson et al. | |
| 2011/0090785 A1 * | 4/2011 | Shimizu et al. | 370/218 |

FOREIGN PATENT DOCUMENTS

| | | |
|---|---|---|
| EP | 1 494 120 A2 | 1/2005 |
| JP | H06-199154 | 7/1994 |
| JP | H08-106426 | 4/1996 |
| WO | PCT/US2012/061545 | 5/2013 |

OTHER PUBLICATIONS

"IEEE 802.11" Wikipedia.org archives Aug. 31, 2010.*
(Continued)

*Primary Examiner* — Azam Cheema
(74) *Attorney, Agent, or Firm* — Kramer & Amado, P.C.

(57) ABSTRACT

The backup-in-the-middle primary-backup configuration is created by placing a backup-in-the-middle forwarder in the routing path between the primary and the environment. The backup-in-the-middle forwarder intercepts output messages along with required state information sent by the primary to the environment. The backup-in-the-middle forwarder backs up the primary by updating its state information and forwards the output packets to the environment.

23 Claims, 4 Drawing Sheets

(56) References Cited

OTHER PUBLICATIONS

Ken Birman, et al., "A Scalable Services Architecture", 25th IEEE Symposium on Reliable Distributed Systems (SRDS '06) © 2006 IEEE, 12 pages. Department of Computer Science, Cornell University, Ithaca, New York.
Robert Van Renesse, et al., "Chain Replication for Supporting High Throughput and Availability", OSDI '04: 6th Symposium on Operating Systems Design and Implementation, 2004, pp. 91-104, FAST Search & Transfer ASA, Tromso, Norway and Department of Computer Science, Cornell University, Ithaca, New York.
Thomas C. Bressoud, et. al., "Hypervisor-Based Fault-Tolerance", ACM Transactions on Computer Systems, vol. 14, No. 1, Feb. 1996, pp. 80-107, Isis Distributed Systems and Cornell University.
Brendan Cully, et. al., "Remus: High Availability via Asynchronous Virtual Machine Replication", USENIX Association, NSDI '08: 5th USENIX Symposium on Networked Systems Deisgn and Implementation, 2008, pp. 161-174, Department of Computer Science, The University of British Columbia.
Pramod Koppol, et. al., "Brief Announcement: The Inherent Difficulty of Timely Primary-Backup Replication", PODC'11, Jun. 6-8, 2011, 2 pages, San Jose, California, USA.

* cited by examiner

METHOD AND APPARATUS FOR IN THE MIDDLE PRIMARY BACKUP REPLICATION

TECHNICAL FIELD

The invention relates generally to methods and apparatus for providing primary backup replication.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known asynchronous virtual machine (VM) replication systems, primary-backup methods must synchronize the primary's state with a backup before the messages from the primary may be sent to the environment. In these embodiments, the primary buffers output messages, sends state information to the backup, waits for acknowledgement from the backup and then releases the buffered messages to the environment. The primary buffers messages because if messages are released immediately to the environment, the environment and the backup will have differing views of the primary state. This inconsistency may result in an application error. Thus, these backup methods may introduce delay in the communication from the primary to the environment arising from the primary-backup synchronization. In some known systems, primary-backup communications are provisioned for low latency in order to obtain adequate network performance. Low latency provisioning may require an expensive, high-speed interconnection, or a compromise on fault-tolerance by placing the primary and backup physically close together.

SUMMARY

Various embodiments provide a method and apparatus of providing a backup-in-the-middle primary-backup configuration that improves network performance while providing high fault tolerance and high availability. The backup-in-the-middle primary-backup configuration decreases the synchronization delay in releasing buffered output. Synchronization delay is decreased by placing a backup-in-the-middle forwarder in the routing path between the primary and the intended recipient(s) of the messages (i.e., the environment) .The backup-in-the-middle forwarder receives the required state information and also intercepts output messages sent by the primary to the environment. The backup-in-the-middle forwarder backs up the primary by updating its copy of the primary state information and forwards the messages to the environment.

Advantageously, since the backup-in-the-middle forwarder does not need to acknowledge the received messages from the primary, the synchronization delay due to the primary waiting for an acknowledgement from the backup may be eliminated. Moreover, since the synchronization delay between the primary and backup is eliminated, the primary and backup may be remote from each other improving reliability (e.g., fault tolerance).

In one embodiment, a method is provided for providing primary-backup services. The method includes receiving an input message and state information from a primary, synchronizing a stored primary state based on the state information, and transmitting a forwarded message to an environment, the forwarded message being based on the input message.

In some embodiments, the method further includes receiving a failover indication, the failover indication indicating that the primary is relinquishing control over at least one primary task, and performing the at least one primary task based on the stored primary state.

In some embodiments, the method further includes receiving one or more environmental messages from the environment, recording the one or more environmental messages in the digital data storage, and synchronizing an updated primary state based on the state information and the one or more recorded environmental messages.

In another embodiment, an apparatus is provided for providing primary-backup services. The apparatus includes a digital data storage and a processor communicatively coupled to the digital data storage. The processor is configured to receive an input message from a primary, receive state information from the primary, synchronize a stored primary state based on the state information, and transmit an output message based on the input message to an environment.

In some embodiments, the processor is further configured to receive a failover indication, the failover indication indicating that the primary is relinquishing control over at least one primary task; and perform the at least one primary task based on the stored primary state.

In some embodiments, the processor is further configured to receive one or more environmental messages from the environment, record the one or more environmental messages in the digital data storage, and synchronize an updated primary state based on the state information and the one or more recorded environmental messages.

In some embodiments, the apparatus further includes an I/O interface communicatively coupled to the processor, the I/O interface configured to receive the input message and the state information.

In some embodiments, the I/O interface is capable of supporting a plurality of communication protocols.

In some embodiments, the I/O interface comprises at least one packet interface and at least one wireless interface.

In some embodiments, the input messages are packets.

In some embodiments, the apparatus is capable of being remotely located from the primary.

In some embodiments, the state information corresponds with the input message.

In some embodiments, the step of transmitting the forwarded message occurs after the step of receiving the corresponding state information.

BRIEF DESCRIPTION OF THE DRAWINGS

Various embodiments are illustrated in the accompanying drawings, in which.

To facilitate understanding, identical reference numerals have been used to designate elements having substantially the same or similar structure and/or substantially the same or similar function.

DETAILED DESCRIPTION OF ILLUSTRATIVE EMBODIMENTS

The backup-in-the-middle primary-backup configuration is created by placing a backup-in-the-middle forwarder in the routing path between the primary and the environment. The backup-in-the-middle forwarder intercepts the output messages sent by the primary to the environment and also captures the state information that the primary sends to the forwarder itself. The backup-in-the-middle forwarder backs up the primary by updating its state information and forwards the output packets to the environment.

Advantageously, the backup-in-the-middle forwarder may eliminate the synchronization delay between the primary and backup because the primary does not need to wait for an acknowledgement from the backup before transmitting the messages. Moreover, since the synchronization delay between the primary and backup is eliminated, the primary and backup may be remote from each other improving reliability (e.g., fault tolerance).

However, it should be appreciated that though the backup-in-the-middle primary-backup configuration system eliminates synchronization delay, the backup-in-the-middle primary-backup configuration system may introduce transmission delays beyond the delay that a message would suffer in the absence of any backup scheme. For example, the backup-in-the-middle forwarder may introduce delays when buffering and forwarding packets, reading in the state information packets, and/or during any retransmissions in the case of lost state information packets.

Figure 1:
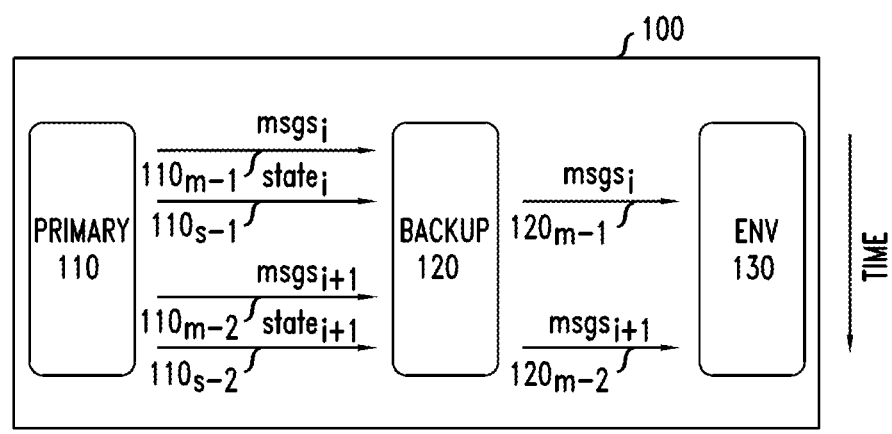
FIG. 1 depicts a functional block diagram illustrating an embodiment of the backup-in-the-middle primary-backup configuration.

FIG. 1 depicts a functional block diagram illustrating an embodiment of the backup-in-the-middle primary-backup configuration system 100. A backup-in-the-middle primary-backup configuration system 100 includes a backup-in-the-middle forwarder 120 positioned between a primary 110 and the environment 130 such that input messages 110$m$-1 and 110$m$-2 sent from the primary 110 to the environment 130 pass through the backup-in-the-middle forwarder 120.

The primary 110 transmits input messages 110$m$1-110$m$-2 directed to environment 130 via backup-in-the-middle forwarder 120. The primary 110 also transmits the state information 110$s$-1 and 110$s$-2 used by the backup-in-the-middle forwarder 120 to synchronize its operation state with the primary.

The input messages 110$m$-1 and 110$m$-2 (collectively, input messages 110$m$) may be a sequence of messages. For example, messages may be tasks that are to be routed to a destination node "in the environment 130" for execution on the destination node. In some embodiments, a message is an IP or TCP packet.

The forwarded messages 120$m$-1 and 120$m$-2 (collectively, forwarded messages 120$m$) correspond to input messages 110$m$-1 and 110$m$-2 respectively. It should be appreciated that though the forwarded messages 120$m$ correspond with input messages 110m, the backup-in-the-middle forwarder 120 may modify the header or payload of the forwarded messages 120$m$.

The state information 110$s$-1 and 110$s$-2 (collectively, state information 110$s$) is the information used by the backup-in-the-middle forwarder 120 to synchronize its stored version of the state of the primary with the state of primary 110. For example, state information 110$s$ may provide checkpoint state (e.g., memory and disk). It should be appreciated that if the backup is not synchronized with the primary, system errors may result when the backup takes over for a failed primary.

The backup-in-the-middle forwarder 120 buffers the input messages 110$m$-1 and 110$m$-2 from the primary 110 until receiving corresponding state information, e.g., state information 110$s$-1 and 110$s$-2 respectively. Once the backup-in-the-middle forwarder 120 has updated its state accordingly, the backup-in-the-middle forwarder 120 forwards the messages 120$m$-1 and 120$m$-2 toward the environment 130. It should be appreciated that since the backup-in-the-middle forwarder 120 does not need to acknowledge synchronization with the primary before forwarding the received messages 110$m$-1 and 110$m$-2, no synchronization delay occurs between sequential messages such as 110$m$-1 and 110$m$-2. The backup-in-the-middle forwarder 120 may also receive messages (not shown for clarity) from the environment 130 (i.e., environmental messages) and forward them to the primary 110. It should be appreciated that the backup-in-the-middle forwarder 120 may forward messages from the environment 130 directed to the primary 110 directly (e.g., without updating saved state information).

The environment 130 receives the forwarded messages 120$m$ from the backup-in-the-middle forwarder 120. A destination node in the environment 130 executes the forwarded messages 130. A node in the environment 130 may also transmit messages to the primary 110 directly or via the backup-in-the-middle forwarder 120.

It should be appreciated that the input messages 110$m$, the forwarded messages 120$m$ and state information 110$s$ are illustrated in a temporally simplified manner and may be sequenced in any suitable manner. In particular, network delays may cause a plurality of input messages 110$m$ to be received by the backup-in-the-middle forwarder 120 before the backup-in-the-middle forwarder 120 receives the state information corresponding to the first transmitted input message 110m. For example, in FIG. 1, the input messages 110$m$-1 and 110$m$-2 may be received by the backup-in-the-middle forwarder 120 before the state information 110$s$-1 is received. Moreover, the forwarded message 120$m$ corresponding to an input message 110$m$ may be transmitted after any number of input messages 110$m$ and/or state information 110$s$. For example, in FIG. 1, the input messages 110$m$-1 and 110$m$-2 and the state information 110$s$-1 may be transmitted by the primary 110 before the forwarded message 120$m$-1 is forwarded by the backup-in-the-middle forwarder 120.

In some embodiments, state information 110$s$ may be sent without a corresponding message in order to synchronize backup-in-the-middle forwarder 120 with primary 110. For example, state information 110$s$-1 may relate to updating a routing table and thus not have a corresponding message 110$m$-1.

In some embodiments, a state information 110$s$ checkpoint may correspond to a plurality of input messages 110$m$. For example, referring to FIG. 1, primary 110 may transmit input messages 110$m$-1 and 110$m$-2 and then transmit state information 110$s$-2 representing the primary state after both input messages have been transmitted. In this example, state information 110$s$-1 would not need to be sent as state information 110$s$-2 corresponds to both input messages 110$m$-1 and 110$m$-2.

In some embodiments, the backup-in-the-middle forwarder 120 may forward an input message such as 110$m$-1 without receiving corresponding state information 110$s$-1 if the primary state is deterministic based on information available to the backup-in-the-middle forwarder 120. Advantageously, the backup-in-the-middle forwarder 120 would be capable of forwarding input messages 110m received from the primary 110 without waiting for corresponding state information 110s.

In a further embodiment of this embodiment, the state of the primary 110 is deterministic based on received environmental messages destined for primary 110. For example, if the computation of the updated state information at the primary 110 was based on environmental messages destined to the primary 110, the backup-in-the-middle forwarder 120 could record the environmental messages. In this embodiment, if the primary 110 fails, the backup-in-the-middle forwarder 120 can synchronize to the state of the primary 110 by using the last received state information, e.g., 110s-1, and "replaying" the recorded sequence of received environmental messages not represented in the last received state information 110s-1. Moreover, if the backup-in-the-middle forwarder 120 records the input messages 110m to the environment 130, the backup-in-the-middle forwarder 120 can suppress re-sending these input messages 110m during its replay if necessary.

In some embodiments, primary 110 may be a network-intensive virtual machine performing computations, routing, relaying and forwarding and requiring high availability and high performance. In these embodiments, the primary 110 may receive messages from local tasks and/or remote requests from nodes in the environment. The primary 110 may then form the input messages 110m for transmission to the environment 130 via the backup-in-the-middle forwarder 120. In some embodiments, messages are sent using TCP/IP, SIP and/or RTP packets.

Figure 2:
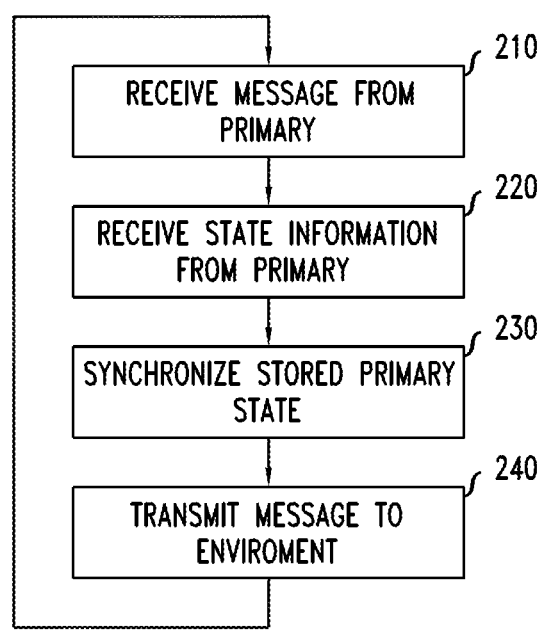
FIG. 2 depicts a flow chart illustrating an embodiment of a method for providing primary-backup services using the backup-in-the-middle forwarder 120 of FIG. 1.

FIG. 2 depicts a flow chart illustrating an embodiment of a method for providing primary-backup services using the backup-in-the-middle forwarder 120 of FIG. 1. Referring to FIGS. 1 and 2, the backup-in-the-middle forwarder 120 receives an input message 110m-1 from the primary 110 (e.g., step 210 of method 200). The backup-in-the-middle forwarder 120 also receives state information 110s-1 from the primary 110 (e.g., step 220 of method 200). The backup-in-the-middle forwarder 120 synchronizes its stored state of the primary (e.g., step 230 of method 200) and transmits the forwarded message 120m-1 to the environment 130 (e.g., step 240 of method 200).

In the method 200, the step 210 includes receiving an input message (e.g., message 110m-1 of FIG. 1) from a primary (e.g., primary 110 of FIG. 1) as described in FIG. 1.

In the method 200, the step 220 includes receiving state information (e.g., state information 110s-1 of FIG. 1) from a primary (e.g., primary 110 of FIG. 1) as described in FIG. 1.

In the method 200, the step 230 includes synchronizing the stored state of the primary as described in FIG. 1.

In the method 200, the step 240 includes transmitting a forwarded message (e.g., message 120m-1 of FIG. 1) to an environment (e.g., environment 130 of FIG. 1) as described in FIG. 1.

After step 240, method 200 returns to step 210 to repeat the process of forwarding received input messages (e:g., input messages 110m) from the primary (e.g., primary 110).

In some embodiments of the method 200, an input message received from the primary in step 210 is not transmitted in step 240 until after the corresponding state information has been received in step 220.

In other embodiments of the method 200, an input message received from the primary in step 210 may be transmitted in step 240 without receiving corresponding state information in step 220. For example, when the state of the primary is deterministic as described in FIG. 1, one or more input messages may be received in step 210 and transmitted in step 240 before or after receiving state information in step 220.

In some embodiments of the method 200, the backup-in-the-middle forwarder 120 may use the stored primary state to provide primary-backup recovery. For example, upon a failover indication that the backup-in-the-middle forwarder 120 is to take over for a primary 110, the backup-in-the-middle forwarder 120 may use the primary state to resume communications with the environment. It should be appreciated that the backup-in-the-middle forwarder 120 may take over all of the tasks being performed by the primary or a subset of the primary tasks. For example, for a primary providing a number of virtual machines, resources from one or more of the virtual machines may have experienced a failure requiring a failover indication for those subset of tasks.

Figure 3:
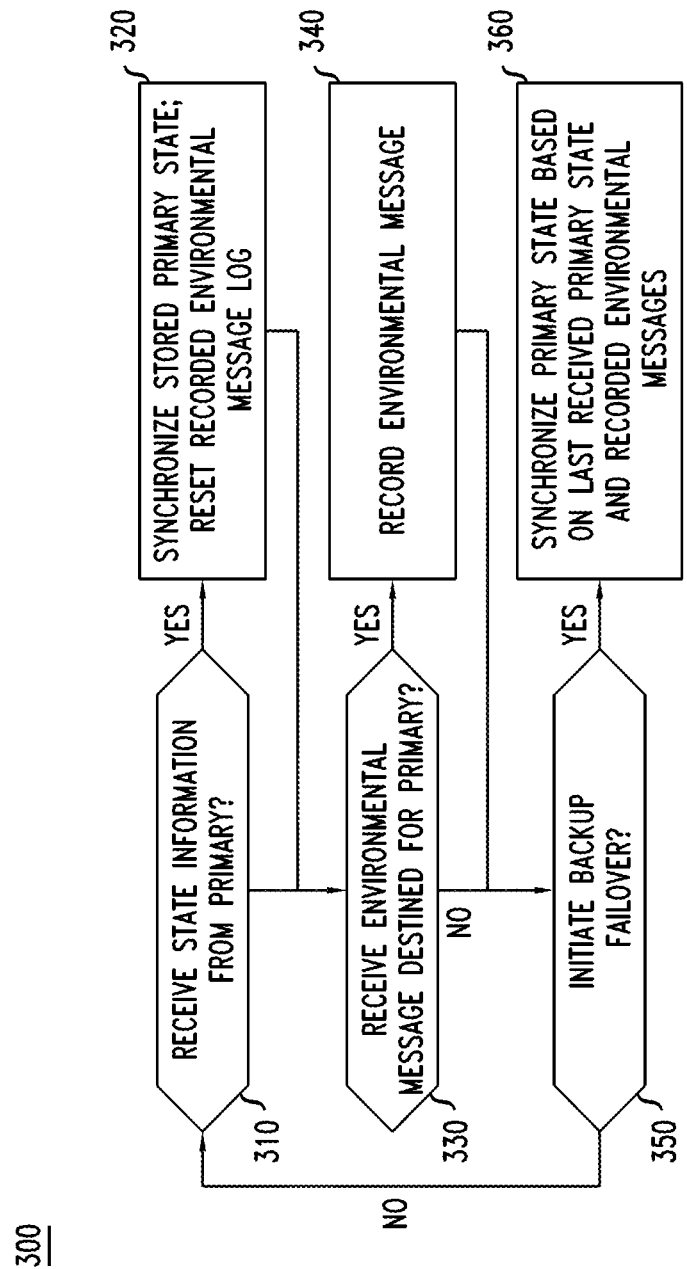
FIG. 3 depicts a flow chart illustrating an embodiment of a method for providing deterministic primary-backup recovery using the backup-in-the-middle forwarder 120 of FIG. 1.

FIG. 3 depicts a flow chart illustrating an embodiment of a method for providing deterministic primary-backup recovery using the backup-in-the-middle forwarder 120 of FIG. 1. Referring to FIGS. 1 and 3, the backup-in-the-middle forwarder 120 determines whether it has received state information (e.g., step 310 of method 300), and if so, synchronizes the stored primary state with the received state information and resets the log of recorded received environmental messages (e.g., step 320 of method 300). The backup-in-the-middle forwarder 120 also determines whether it has received environmental messages from environment 300 (e.g., step 330 of method 300), and if so, records the received environmental message in a log of received environmental messages (e.g., step 340 of method 300). The backup-in-the-middle forwarder 120 also determines whether to initiate a backup failover (e.g., step 350 of method 300), and if so, synchronizes the primary state based on the stored primary state and the log of recorded environmental messages (e.g., step 360 of method 300).

In the method 300, the step 310 includes determining if state information (e.g., state information 110s-1 of FIG. 1) has been received from a primary (e.g., primary 110 of FIG. 1) as described in FIG. 1.

In the method 300, if state information has been received as determined in step 310, step 320 includes updating the stored primary state and resetting the log of recorded environmental messages. For example, recorded environmental messages that are already represented in the updated primary state would no longer be needed to synchronize the backup to the primary state and may be deleted or marked in any suitable manner.

In the method 300, the step 330 includes determining if an environmental message (e.g., not shown for clarity in FIG. 1) has been received from the environment (e.g., environment 130 of FIG. 1) as described in FIG. 1.

In the method 300, if an environmental message has been received as determined in step 330, step 340 includes recording the environmental message is a log.

In the method 300, the step 350 includes determining if the backup-in-the-middle forwarder 120 should take over operation for the primary (e.g., primary 110). The backup-in-the-middle forwarder 120 may determine to take over as the primary by any suitable means such as receiving a message from an apparatus monitoring the status of network nodes, receiving a message from the primary itself, determining that the primary is no longer operational, and/or any suitable means. A backup-in-the-middle forwarder 120 may determine that the primary is no longer operational by using heartbeat messages, status messages and/or using any other suitable monitoring technique.

In the method 300, if the backup-in-the-middle forwarder 120 has determined that it should take over operation for the primary as determined in step 330, step 340 includes creating the primary state. The backup-in-the-middle forwarder 120 creates the primary state based on the stored primary state and the log of recorded environmental messages received after the effective stored primary state. For example, the backup-in-the-middle forwarder 120 may use the known deterministic state behavior to analyze each successive environmental message in the log and update the primary state according to the known deterministic state behavior.

After step 350, method 300 returns to step 310 to repeat the process of maintaining primary state based on received state information (e.g., state information 110s in FIG. 1) and received environmental messages destined for the primary (e.g., primary 110 in FIG. 1).

Although primarily depicted and described in a particular sequence, it should be appreciated that the steps shown in method 200 and 300 may be performed in any suitable sequence. Moreover, the steps identified by one box may also be performed in more than one place in the sequence.

It should be appreciated that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Figure 4:
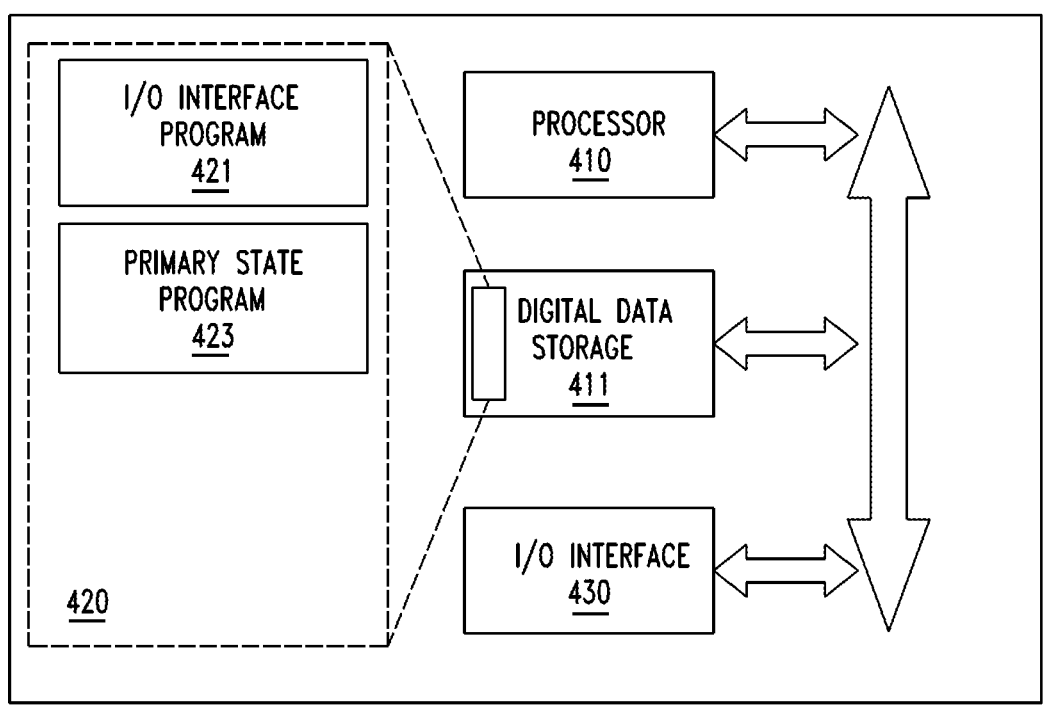
FIG. 4 schematically illustrates blocks of one embodiment of backup-in-the-middle router 120 of FIG. 1.

FIG. 4 schematically illustrates one embodiment of backup-in-the-middle forwarder 120 of FIG. 1. The backup-in-the-middle forwarder 400 may perform the functions described herein, e.g., using the methods 200 and/or 300. The backup-in-the-middle forwarder 400 includes a processor 410 and a digital data storage 411.

The processor 410 controls the operation of the backup-in-the-middle forwarder 400. The processor 410 cooperates with the digital data storage 411.

The digital data storage 411 may store the stored primary state (e.g., step 230 in FIG. 2 a, d steps 320 and 360 in FIG. 3); buffer the received and transmitted input messages, state information environmental messages and primary status messages (e.g., steps 210, 220 and 240 in FIG. 2 and steps 310, 330 and 350 in FIG. 3) and store the recorded environmental messages (e.g., step 340 in FIG. 3). The digital data storage 411 also stores programs 420 executable by the processor 410.

The processor-executable programs 410 may include an I/O interface program 421 and/or a primary state program 423. Processor 410 cooperates with processor-executable programs 420 to implement the functionality described in FIGS. 1-3 and/or perform the steps of methods 200 and/or 300.

The I/O interface 430 is configured for supporting any suitable number of channels supporting any suitable number(s) of sessions (e.g., any suitable number of IP flows), which may be directed between the backup-in-the-middle forwarder 400 and one or more primaries (e.g., primary 110 in FIG. 1) and the environment (e.g., environment 130 in FIG. 1). I/O interface 430 may support any suitable type(s) of communication paths and communication protocols. For example, communication paths may include wireless communications (e.g., GSM and CDMA); wireline communications; packet network communications (e.g., IP); broadband communications (e.g., DSL); and the like, as well as various combinations thereof.

When processor-executable programs 420 are implemented on a processor 410, the program code segments combine with the processor to provide a unique device that operates analogously to specific logic circuits.

Although depicted and described herein with respect to embodiments in which, for example, programs and logic are stored within the digital data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term digital data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for providing primary-backup services, comprising:
    at a processor communicatively coupled to a digital data storage, receiving an input message directed to an intended recipient from a primary;
    receiving, by the processor in cooperation with the digital data storage, state information from the primary;
    synchronizing, by the processor in cooperation with the digital data storage, a stored primary state based on the state information; and
    transmitting, by the processor in cooperation with the digital data storage, a forwarded message to the intended recipient, the forwarded message corresponding to the input message.

2. The method of claim 1, wherein the state information corresponds with the input message.

3. The method of claim 2, wherein the step of transmitting the forwarded message occurs after the step of receiving the corresponding state information.

4. The method of claim 1, further comprising:
    receiving, by the processor in cooperation with the digital data storage, a failover indication, the failover indication indicating that the primary is relinquishing control over at least one primary task; and
    performing, by the processor in cooperation with the digital data storage, the at least one primary task based on the stored primary state.

5. The method of claim 1, further comprising:
    receiving, by the processor in cooperation with the digital data storage, one or more environmental messages from the environment;
    recording, by the processor in cooperation with the digital data storage, the one or more environmental messages in the digital data storage; and
    synchronizing, by the processor in cooperation with the digital data storage, an updated primary state based on the state information and the one or more recorded environmental messages.

6. A digital message handling apparatus, comprising:
    a digital data storage; and
    a processor communicatively coupled to the digital data storage, the processor configured to:
        receive an input message directed to an intended recipient from a primary;
        receive state information from the primary;
        synchronize a stored primary state based on the state information; and
        transmit an output message corresponding to the input message to the intended recipient.

7. The apparatus of claim 6, wherein the state information corresponds with the input message.

8. The apparatus of claim 6, wherein the step of transmitting the forwarded message occurs after the step of receiving the corresponding state information.

9. The apparatus of claim 6, wherein the processor is further configured to:
    receive a failover indication, the failover indication indicating that the primary is relinquishing control over at least one primary task; and
    perform the at least one primary task based on the stored primary state.

10. The apparatus of claim 6, wherein the processor is further configured to:
    receive one or more environmental messages from the environment;
    record the one or more environmental messages in the digital data storage; and
    synchronize an updated primary state based on the state information and the one or more recorded environmental messages.

11. The apparatus of claim 6, further comprising:
    an I/O interface communicatively coupled to the processor, the I/O interface configured to receive the input message and the state information.

12. The apparatus of claim 11, wherein the I/O interface is capable of supporting a plurality of communication protocols.

13. The apparatus of claim 12, wherein the I/O interface comprises at least one packet interface and at least one wireless interface.

14. The apparatus of claim 11, wherein the input messages are packets.

15. The apparatus of claim 6, wherein the apparatus is capable of being remotely located from the primary.

16. The apparatus of claim 6,
    wherein the state information is associated with the input message; and
    wherein the transmission of the output message is based on reception of the state information.

17. The apparatus of claim 16,
    wherein the state information provides information associated with a first state of the primary.

18. The apparatus of claim 17,
    wherein the state information comprises a memory checkpoint state.

19. A non-transitory digital data storage medium encoding a machine-executable program of instructions to perform a method, the method comprising:
    receiving an input message directed to an intended recipient from a primary;
    receiving, by the processor in cooperation with the digital data storage, state information from the primary;
    synchronizing, by the processor in cooperation with the digital data storage, a stored primary state based on the state information; and
    transmitting, by the processor in cooperation with the digital data storage, an output message corresponding to the input message to the intended recipient.

20. A system for providing primary-backup services, comprising:
    a digital data storage; and
    a processor communicatively coupled to the digital data storage, the processor configured to:
        receive an input message directed to an intended recipient from a primary;
        receive state information from the primary;
        synchronize a stored primary state based on the state information; and
        transmit an output message corresponding to the input message to the intended recipient.

21. The system of claim 20, wherein the processor is further configured to:

receive a failover indication, the failover indication indicating that the primary is relinquishing control over at least one primary task; and perform the at least one primary task based on the stored primary state.

22. The system of claim 20, wherein the processor is further configured to:

receive one or more environmental messages from the environment;

record the one or more environmental messages in the digital data storage; and synchronize an updated primary state based on the state information and the one or more recorded environmental messages.

23. The system of claim 20, further comprising:

an I/O interface communicatively coupled to the processor, the I/O interface configured to receive the input message and the state information.

* * * * *